(12) United States Patent
Herrmann et al.

(10) Patent No.: US 9,905,139 B2
(45) Date of Patent: Feb. 27, 2018

(54) CREASED ADHESIVE IN-STORE MARKETING SIGNAGE

(71) Applicant: XEROX CORPORATION, Norwalk, CT (US)

(72) Inventors: Douglas K Herrmann, Webster, NY (US); Richard F Scarlata, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 220 days.

(21) Appl. No.: 14/516,597

(22) Filed: Oct. 17, 2014

(65) Prior Publication Data
US 2015/0332619 A1 Nov. 19, 2015

Related U.S. Application Data

(60) Provisional application No. 61/992,928, filed on May 14, 2014.

(51) Int. Cl.
G09F 3/18 (2006.01)
G09F 7/00 (2006.01)
G09F 23/06 (2006.01)
B32B 7/12 (2006.01)
B32B 21/04 (2006.01)
B32B 3/26 (2006.01)
G09F 3/20 (2006.01)

(52) U.S. Cl.
CPC ............. G09F 7/00 (2013.01); B32B 3/266 (2013.01); B32B 7/12 (2013.01); B32B 21/04 (2013.01); G09F 23/06 (2013.01); *G09F 3/204* (2013.01); *Y10T 156/1051* (2015.01)

(58) Field of Classification Search
CPC ............. G09F 1/04; G09F 1/06; G09F 3/20
USPC .................. 40/591, 124.09, 124.11
See application file for complete search history.

(56) References Cited

U.S. PATENT DOCUMENTS

| 5,568,695 | A  | * | 10/1996 | Kough .................... 40/124.09 |
| 6,682,099 | B1 | * | 1/2004  | Laurash et al. ............. 283/61 |
| 7,004,507 | B2 | * | 2/2006  | Shulman .................... 283/106 |
| 7,040,049 | B2 | * | 5/2006  | Cox et al. ............. 40/124.191 |
| 7,975,416 | B2 |   | 7/2011  | Engelby et al. |
| 2007/0245611 | A1 |   | 10/2007 | McDonald |

* cited by examiner

*Primary Examiner* — Shin H Kim

(57) ABSTRACT

An in-store adhesive marketing signage method that allows semi-rigid and rigid store signage cards to conform to store shelves includes placing a crease/score on the cards above a bump on a label holder. The crease/score then relieves force on the cards and thereby eliminates the initiation of peeling away from the label holder.

16 Claims, 1 Drawing Sheet

CREASED ADHESIVE IN-STORE MARKETING SIGNAGE

CROSS-REFERENCE TO RELATED APPLICATION

This application claims the benefit of U.S. Provisional Application No. 61/992,928, filed May 14, 2014.

BACKGROUND

1. Field of the Disclosure

The present disclosure relates to in-store marketing signage, and more particularly, to a method and device for improving the adhering of marketing signage to store shelves.

2. Description of Related Art

A snap-on label holder adapted for direct mounting to the front edge of a shelf is shown in U.S. Pub. No. 2007/0245611 A1 that has a hingable front pocket member interconnected by a flexible hinge to a book-shaped rear mounting member. The rear mounting member profile defines an interior region flanked between two opposite jaws adapted to be snapped onto a shelf edge. The interior region includes a sinuous-shaped profile that acts both as a spring-bias means providing an improved snap-on function and as a fulcrum against which the front pocket member bottom can be pressed on to open the pocket front panel.

In U.S. Pat. No. 7,975,416 B2, a non-adhesive type marketing sign is shown that includes a free portion, a base portion and a connected portion that couples the base portion to the free portion. The base portion includes an engaging piece and a support piece. The engaging piece is coupled to the support piece of a base bend line and configured to engage with a portion of a product display structure having a price holder.

Currently, the process being used to create adhesive signage for some in-store shelving involves applying a pressure sensitive adhesive tape to a substrate and then printing the signs on the modified substrate. The adhesive on the signage works well when applied to a flat surface but in-store shelf markers are extruded and are designed for non-adhesive insert signs. The shelf rail profile results in a moment being applied to non-insertable signs which create a peel stress that causes the signs to become loose and fall off. The choice of adhesive is a balance of constraints which includes the ability to hold in ambient, refrigerated and freezer conditions for up to three weeks, but the adhesive cannot be so strong that it leaves any residue or causes the signage to tear during removal.

One example of the heretofore mentioned problem is shown in prior art FIG. 1 in which a snap-on label holder 10 is provided with a front pocket member 12 interconnected to back panel 14 and a rear mounting member 20. Rear mounting member 20 is adapted to be snapped onto the front edge of a metal, wood or plastic shelf or the like. Front pocket member 12 is comprised of back panel 14 and a clear front panel 16 together forming upwardly opening label pocket 12 for holding a non-adhesive information label (not shown). Front pocket 12 is interconnected with rear mounting member 20 which can be simply snapped onto the front of shelving. However, a problem is created with this type of snap-on label holder when a signage substrate or sheet 30 is used that is required to be adhered to front panel 16 instead of being inserted into pocket 12. Signage sheet 30 includes a pressure sensitive adhesive strip 32 applied thereto and is pressed against front panel 16 and up against stop 17 of label holder 10. Label holder 10 has a bump 18 on the bottom thereof that presses out on adhesive strip 32 and rigid signage 30. The resulting force creates a peel force on adhesive strip 32 through the rigidity of the signage substrate 30. Signage sheet 30 causes a moment at about the top of the sheet creating a peel force at the bottom of the adhesive strip. This force overtime causes the peel to migrate from the bottom edge of the adhesive to the top edge which then causes the adhesive strip 32 on signage substrate 30 to release from the label holder front panel 16. The signage substrates then end up falling off of the label holder front panel 16 onto the floor. Conventional adhesives on the signage works well when applied to a flat surface but in-store shelf markers are extruded and are designed for non-adhesive insert signs. The shelf rail profile results in a moment being applied to the sign which creates a peel stress that causes the signs to become loose and fall off.

Thus, there is still a need for a signage substrate with an adhesive attached thereto that will stay adhered to a label holder for an extended period of time in differing climate conditions.

BRIEF SUMMARY

In answer thereto, provided hereinafter is an in-store adhesive marketing signage method and device that allows semi-rigid and rigid store signage cards to conform to current store shelves that includes placing a crease/score in the signage cards below the adhesive strip and above the bump on a label holder in order to relieve the force on the cards and thereby eliminate the initiation of peeling from the label holder.

BRIEF DESCRIPTION OF THE DRAWINGS

Various of the above-mentioned and further features and advantages will be apparent to those skilled in the art from the specific apparatus or methods described in the example(s) below, and the claims. Thus, they will be better understood from this description of these specific embodiment(s), including the drawing figures (which are approximately to scale) wherein:

Figure 1:
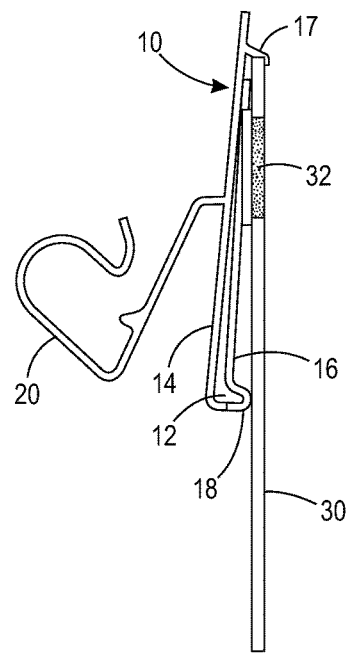
FIG. 1 is side view of a prior art label holder with a marketing sign adhered thereto.
Figure 2:
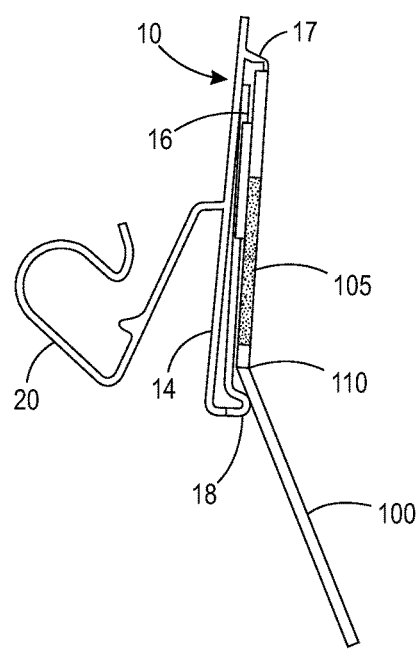
FIG. 2 is side view of the label holder in FIG. 1 with an improved marketing sign adhered thereto in accordance with the method of the present disclosure.

Referring now to label holder 10 in FIG. 2, and in accordance with the present disclosure, an improved marketing sign or card 100 is shown that includes an adhesive 105 that is positioned to be spaced above bump 18 on label holder 10. Immediately below adhesive 105 and above heretofore mentioned bump 18 is a strategically placed weakened pre-formed bend line 110 that can be scored, perforated or cut to a predetermined depth. Placing a crease/score above bump 18 relieves the force on the card and eliminates the peel initiator. The pre-formed crease allows the card to deform consistently which eliminates the peel by providing a crease line and eliminates the forces on the adhesive preventing premature failure of the adhesive strip.

With further reference to FIG. 2, and in accordance with the present disclosure, card 100 includes a first portion that is positioned above crease 110 and parallel with and in direct contact with clear front panel 16 of label holder 10 and a second portion that projects at an angle away from front panel 16 at crease 110 due to its contact with bump 18. By adding crease/score 110 to the card, the moment once created at bump 18 with conventional cards is eliminated and the associated peel force is reduced/eliminated to the point where peel is not initiated and the cards remain adhered to front panel 16.

In recapitulation, a method has been disclosed for strategically placing a crease formed into signage cards that have adhesive attached thereto in order to eliminate a moment of peel force caused by the shape of a label holder onto which they are mounted. Ordinarily, the bump on a label holder pushes out on the rigid adhesive signs, but by adding the crease/score to the signage cards the moment at the bump is eliminated and the associated peel force is reduced/eliminated to the point where peel is not initiated and the cards remain adhered to the label holder.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A method for creating an adhesive mountable in-store marketing sign that is attachable to a label holder that in turn is attachable to display shelves, comprising:
   providing a single-ply sheet material having a front surface and a back surface;
   providing a dividing line for dividing said single-ply sheet material into first and second portions;
   providing an adhesive that includes a front side and a back side and placing said front side of said adhesive on said back surface of said first portion of said single-ply sheet material above said divide between said first and second portions while leaving said back side of said adhesive exposed;
   providing a label holder for attaching said single-ply sheet material thereto, said label holder including a bump at a lower end thereof; and
   weakening said dividing line on said single-ply sheet material that separates said first and second portions thereof and positioning said weakened dividing line below and spaced from said adhesive and above said bump of said label holder in order to relieve a peel force on said marketing sign and thereby eliminate initiation of peeling of said adhesive from said label holder.

2. The method of claim 1, including positioning said adhesive above said dividing line.

3. The method of claim 1, wherein said label holder includes a front panel and wherein said first portion of said sheet material is attached to and in parallel with said front panel.

4. The method of claim 3, wherein said second portion of said sheet material is angled with respect to said first portion at said weakened dividing line in said sheet material.

5. The method of claim 1, wherein said weakened dividing line is created through forming a crease within said sheet material.

6. The method of claim 1, wherein said weakened dividing line is created through forming perforations within said sheet material.

7. The method of claim 1, wherein said weakened dividing line is created through preformed a cut of predetermined depth within said sheet material.

8. An in-store adhesive marketing signage usage method that facilitates semi-rigid and rigid store signage cards in conforming to store shelves, comprising:
   providing a single-ply sheet material;
   dividing said sheet material into first and second portions;
   adhering a front surface of an adhesive to a back surface of said first portion of said single-ply sheet material while said adhesive simultaneously includes an exposed back surface; and
   scoring said first portion with respect to said second portion of said sheet material where said sheet is divided in order to thereby provide an area for bending of said sheet material to control peeling of said adhesive from a surface when said single-ply sheet material is positioned onto store shelves.

9. An adhesive mountable in-store marketing sign, comprising: a single-ply sheet material, said sheet material being divided into first and second portions; a double sided adhesive adhered on one side to a back surface of said first portion of said single-ply sheet material and having the other side exposed; and a score separating said first portion from said second portion of said sheet material in order to control peeling of said double sided adhesive from a surface when said single-ply sheet material is positioned on store shelves; wherein said adhesive is positioned above said score separating said first portion from said second portion of said sheet material; including a sign holder, said sign holder including a front panel and a bump below said front panel; and wherein adding said score to single-ply sheet material eliminates any moment at said bump and any associated peel force is reduced such that peel is not initiated and said single-ply sheet material remains adhered to said sign holder.

10. The in-store marketing sign of claim 9, wherein said first portion of said in-store marketing sign is adhered to said front panel of said sign holder with said adhesive.

11. The in-store marketing sign of claim 10, wherein said score is positioned below said adhesive and above said bump.

12. The in-store marketing sign of claim 11, wherein said second portion of said single-ply sheet material extends at an acute angle away from said first portion of said single-ply sheet material due to said bump on said sign holder.

13. The in-store marketing sign of claim 12, wherein said first portion of said single-ply sheet material is in parallel with said front panel of said sign holder.

14. The in-store marketing sign of claim 9, wherein said score separating said first portion from said second portion of said single-ply sheet material is a crease.

15. The in-store marketing sign of claim 9, wherein said score separating said first portion from said second portion of said single-ply sheet material is comprised of perforations.

16. The in-store marketing sign of claim 9, wherein said score separating said first portion from said second portion of said single-ply sheet material is cut to a predetermined depth and does not extend a width of said second portion of single-ply sheet material.

\* \* \* \* \*